June 8, 1937.   G. P. RINKER   2,083,526
PLANT SUPPORT
Filed July 1, 1936
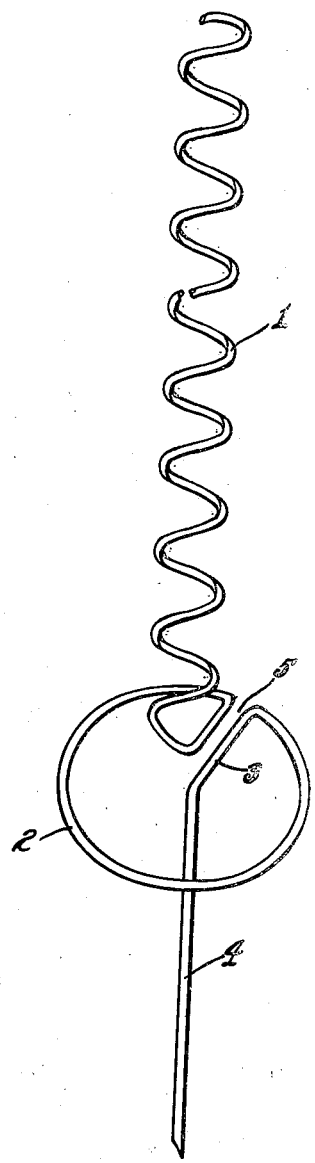
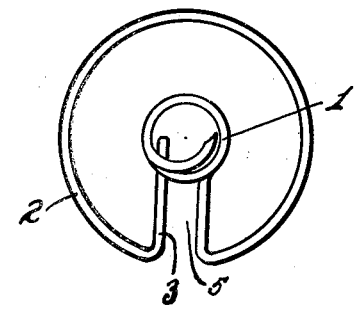
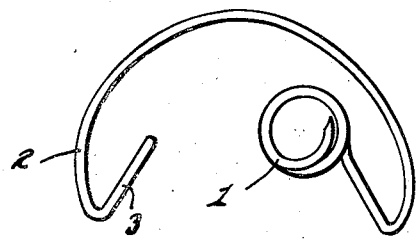
INVENTOR.
BY George P. Rinker,
Hood & Hahn.
ATTORNEYS.

Patented June 8, 1937

2,083,526

UNITED STATES PATENT OFFICE 2,083,526

PLANT SUPPORT

George P. Rinker, Brooklyn, Ind.

Application July 1, 1936, Serial No. 88,320

5 Claims. (Cl. 47—47)

My invention relates to a plant support. In such plants as tomato plants, certain types of garden plants, as, for instance, dahlias, and certain types of potted plants, it is desirable to provide an upright for maintaining the main stem of the plant in a vertical position. This is particularly so where the plants are grown out-of-doors and subjected to wind storms and the beating effect of heavy rains, etc., which will tend to bend or beat the plant down to the ground.

Heretofore, in the commercial art, it has been quite customary to provide an ordinary stake, in the form of possibly a straight piece of wood or a straight piece of wire, driven into the ground adjacent the plant and the plant tied to the stake. An objection to this character of support is that the stake, being extremely rigid, under the force of a high wind, there will be a tendency for the stake to be rocked back and forth until it is pulled out of the ground, or if the stake doesn't give, or if the stake is not pulled out of the ground, there is a tendency for the plant to be pulled out, due to the fact that there is no resiliency in the stake.

It is the object of my invention to provide a simple inexpensive plant support which requires no tying of the plant to the support, which will hold the stem of the plant upright and which, at the same time, will not be rocked or loosened in its position, under the stress of wind or other factors.

Another object of my invention is to provide a plant support having the above characteristics which, in addition, will provide a guard to prevent cultivation of the ground in such close proximity to the plant as to injure the same.

For the purpose of disclosing my invention, I have disclosed an embodiment of the same in the accompanying drawing, in which:

Fig. 1 is a perspective view of a structure embodying my invention;

Fig. 2 is a plan view thereof; and

Fig. 3 is a view similar to Fig. 2, with the base spread to receive the base of the plant.

In the structure illustrated, the support is formed preferably, from a single piece of wire, which is preferably of spring steel or at least of sufficient strength to remain in an upright position and of sufficient resiliency to return to its upright position, even though it may be bent under wind stresses and the like. This wire is bent into a helical coil 1, the lower end of which is continued into a base circle 2 and this base circle has a portion 3 bent at right angles at 4 to provide a ground penetrating portion. Due to the construction of the base portion 2, there is provided a gap 5 in the base which, due to the spring-like material, may be opened up for the purpose of receiving the base of the stem of the plant.

In operation, the gap 5 is opened a sufficient distance to receive the stem of the plant. The ground portion 4 is driven into the ground until the base portion engages the top of the ground. The stem of the plant is wound in the spiral 1 until it extends centrally through the spiral and, if desired, may project above the spiral.

Due to the fact that the base portion engages the surface of the ground, and due to the fact that the spiral portion, particularly, is formed of flexible material, the support may readily bend under the stress of winds or under blows or the like, the bending action taking place throughout the length of the spiral and from the base portion up. The base portion rather rigidly maintains the spiral in its upright position and prevents, to a large extent, the rocking of the ground penetrating portion 4 in the ground, to thereby cause the same to loosen. Perfect freedom of movement of the stem of the plant is permitted and the spiral in no way interferes with the growing of the plant. The branches may grow laterally from the plant, without interference, and while the plant is held in an upright position, it is held in an upright position with sufficient resiliency to permit it to bend or give, so that there is no danger of the plant being broken. Furthermore, the base 2 being of relative large diameter, forms a guard to prevent cultivation of the ground so close to the stem as to damage the same.

I claim as my invention:

1. A plant support comprising a helical coil of resilient material, having a straight stemmed portion adapted to be inserted in the ground adjacent the plant, the helical portion being of such diameter as to embrace and support a single stem of the plant while permitting the branches of said stem to extend between the helices of the coil.

2. A plant support comprising a helical coil, a base at the bottom of said coil, of greater diameter than said coil and having a radial opening therein to receive the stem of the plant, and a straight portion extending downwardly from said base.

3. A plant support formed from a single piece of wire bent to provide a vertical helical coil, a portion of said wire at the base of said coil being bent to provide a ring base of greater diameter than the diameter of the coil, and the remaining portion of the wire being extended downwardly beyond the base, adapted to be inserted into the ground.

4. A plant support comprising a helical coil, a base at the bottom of said coil having a radial opening therein to receive the stem of the plant and a straight portion extending downwardly from said base.

5. A plant support formed from a single piece of wire bent to provide a vertical helical coil, a portion of the wire at the base of said coil being bent to provide a ring base having the helical coil axially disposed relatively to the axis of said ring base, and the remaining portion of the wire being extended downwardly beyond the base and adapted to be inserted in the ground.

GEORGE P. RINKER.